June 5, 1956  W. C. MASON  2,748,628
PORTABLE DRILL FEEDER
Filed April 12, 1952  2 Sheets-Sheet 1
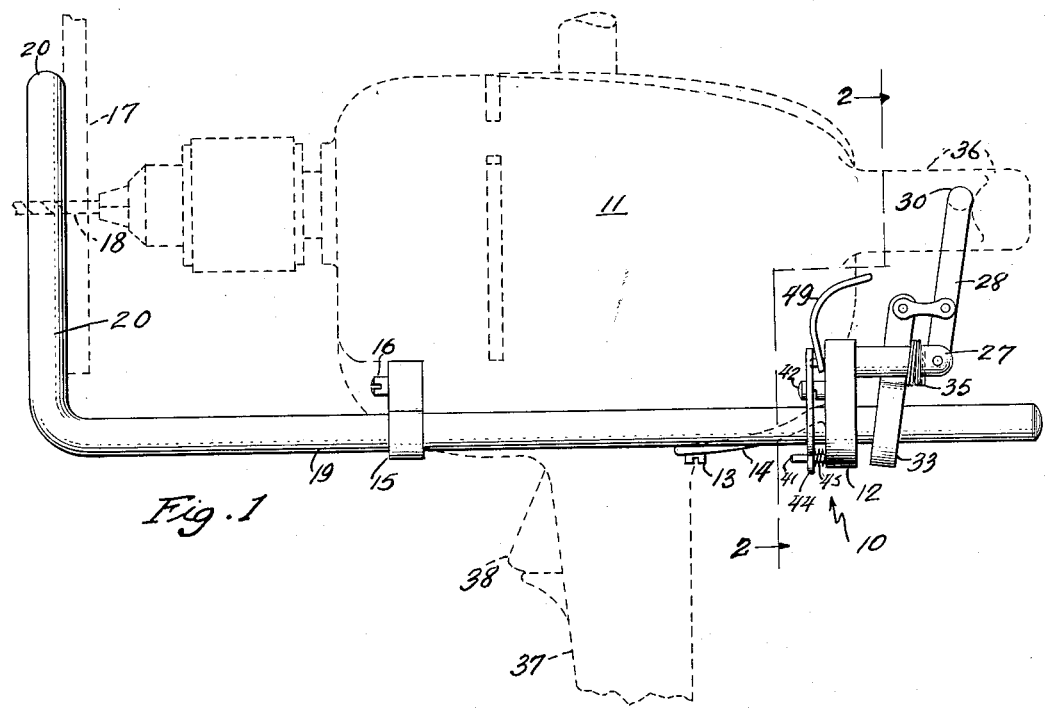
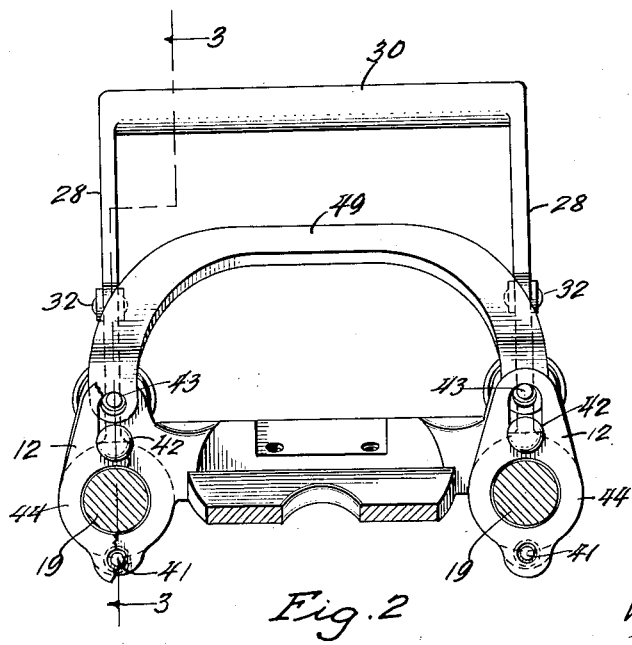
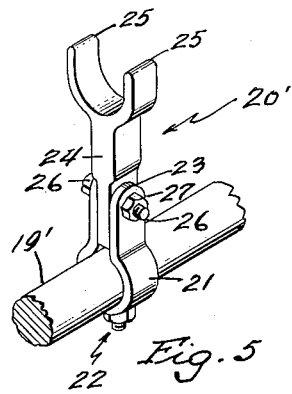
Inventor:
William C. Mason,
by Andros and Smith
His Attorneys.

June 5, 1956 W. C. MASON 2,748,628
PORTABLE DRILL FEEDER
Filed April 12, 1952 2 Sheets-Sheet 2

Inventor:
William C. Mason,
by Andros and Smith
His Attorneys.

United States Patent Office 2,748,628
Patented June 5, 1956

2,748,628
PORTABLE DRILL FEEDER

William C. Mason, Slingerlands, N. Y.

Application April 12, 1952, Serial No. 281,949

6 Claims. (Cl. 77—7)

This invention relates to a mechanism adapted for use with portable drills. More particularly, it pertains to a manually operable and controllable feeder mechanism adapted for use in conjunction with a rotary, portable, electric hand drill, or the like, cooperatively to be associated with the work piece in such a manner that an operator can apply feeding pressure to the drill cutting tool and thereby support the weight of the drill and mechanism, with one hand, in selected angular position wth respect to the work piece, and the provision of such a mechanism is a principal object of the invention.

Generally, it is an object of the invention to provide such a mechanism that is simple, yet sturdy and durable of construction, positive in operation, economic of manufacture, adaptable for use with conventional portable electric hand drills, air drills, or the like, and otherwise well suited to the purposes for which it is intended.

More specifically, it is an object of the invention to provide such a mechanism as that above described with a pressure applying and guiding means adapted rigidly to be brought into abutting relation with a work piece against the action of a rotary cutting tool, cooperatively connected to the drill body, or housing, to guide the latter, and the tool along the longitudinal axis; and pressure feeding means cooperatively associated with the first means in such a manner that the drill is moved therealong in a step-by-step manner in a selected angular position, so that the work piece and drill progressively can be advanced toward each other into counteracting compressed relation.

A further object of the invention is to provide such a mechanism as the foregoing and, in conjunction therewith, a holding means for maintaining the pressure on the tool interlockingly to hold the same in its last advanced step position when manual pressure is released.

Another object of the invention is to provide such a mechanism as the foregoing with means for releasing the pressure on the rotary cutting tool created by the holding means in order to withdraw the same from the work piece when desired.

Other specific objects of the invention are the provision in such a mechanism in which an elongated feeder rod is utilized, adapted movably or slidably to be mounted on the drill, and having an angularly extending foot portion, that preferably is adjustable to any desired angle, to abut the opposite side of the work piece; in which the feeder rod is so mounted in bearings connected to the drill, preferably in a separate frame; in which an actuating device is carried by the frame and adapted grippingly to engage the rod intermittently to move the drill against the work piece in such a step-by-step manner; in which the actuating device includes a feed clutch member adapted to grip opposite sides of the bar; in which a pressure feed lever, preferably mounted on a fulcrum post, pivotally supports the lever, with a spring retractable actuating device connected to the lever grippingly to engage the bar; in which the holding or interlocking means also includes a pressure holding clutch device automatically operable, also preferably connected to the frame, and engageable with the elongated bar or rod; and in which the pressure releasing or unlocking means includes a release lever connected to the frame.

Other objects of the invention will in part be obvious and will in part appear hereinafter.

The invention accordingly comprises the features of construction, combination of elements, and arrangement of parts, which will be exemplified in the mechanism hereinafter set forth and the scope of the application of which will be indicated in the claims.

For a fuller understanding of the nature and objects of the invention, reference should be had to the following detailed description taken in connection with the accompanying drawings, in which:

Fig. 1 is a plan view of a preferred embodiment of the invention illustrating the same affixed to a conventional type of portable electric drill with the pressure feeding means shown in actuating position;

Fig. 2 is an elevational view partly in section, and somewhat enlarged, taken along the lines of 2—2 of Fig. 1 and looking in the direction of the arrows;

Fig. 5 is a perspective view of a fragmentary portion of an elongated feeder rod having mounted thereon a pressure foot adapted to be adjusted to any desired angle.

Referring now more particularly to the drawings, there is illustrated generally at 10 a preferred embodiment of the invention depicted as being attached to a conventional type of portable electric drill indicated in dotted line position at 11. In this view, as previously indicated in the general description in connection with Fig. 1 the pressure applying device of the mechanism is illustrated as being operated, that is, in an initial stage of actuation. The operation thereof will more fully be described hereinafter.

Figure 3:
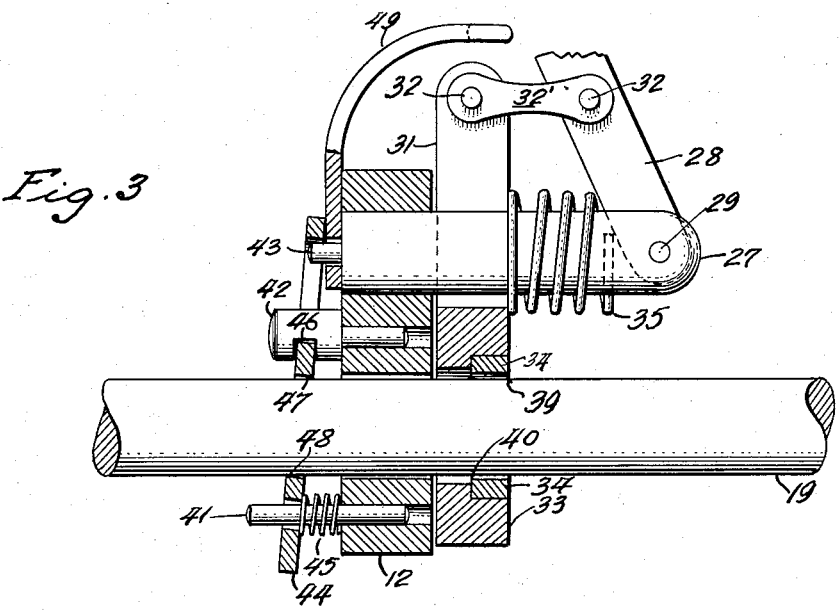
Fig. 3 is a vertical section view, also somewhat enlarged, and with parts broken away, taken along the line 3—3 of Fig. 2 illustrating the pressure feeding means in a relaxed or inoperative position, and with the holding or locking means in an operative position.
Figure 4:
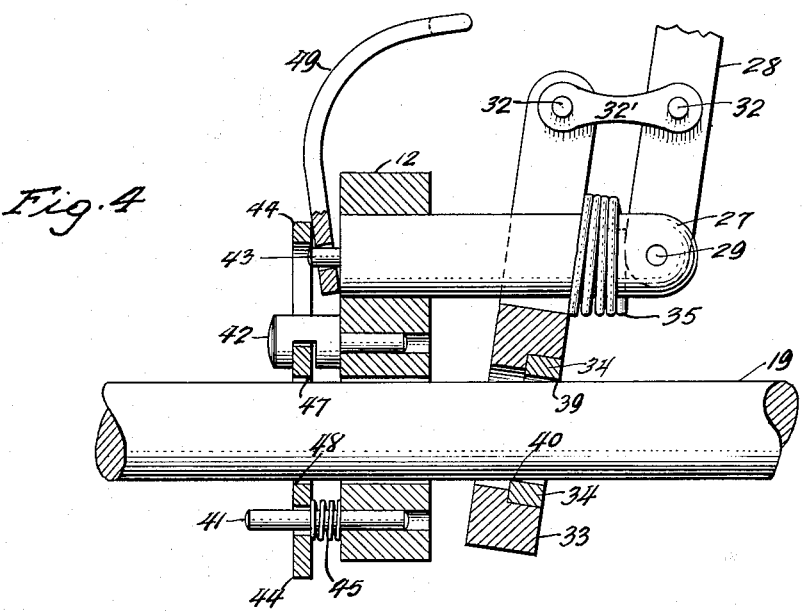
Fig. 4 is a view similar to Fig. 3 showing the pressure feeding means in operation, as in Fig. 1, with the locking means in released position.

A more detailed illustration of the structure can be had by referring now to Figs. 3 and 4 in which there is shown a frame 12 adapted to be affixed or removably attached to the drill housing by removing from the latter certain of the screws which are utilized to connect the housing in position with respect to the internal mechanism of the drill although longer screws can be substituted if necessary. This is illustrated in Fig. 1 wherein screw 13 secures extension arm 14 connected to frame 12 to the drill housing or casing. Also in Fig. 1 there is shown a front guide bearing 15, of which there may be two, secured to the housing 11 by means of suitable screws 16. The frame 12 among other functions, constitutes a rear bearing, or bearings, together with the front guide bearing 15 for the reception of the pressure applying and guiding means adapted to be brought into abutting relation with a work piece 17 indicated in dotted lines against the action of a rotary cutting tool 18, also indicated in dotted lines, in the drill 11. Preferably, the pressure applying and guiding means comprises an elongated feeder rod 19. While a single rod, or bar, may readily be utilized, I prefer such a rod which is so constructed as to comprise two parallel spaced-apart arms as shown in Fig. 2 each of these arms being slidably mounted in an oppositely disposed pair of front guide bearings 15 on the forward arm of the housing of the drill. These two rod portions are integrally connected by an angularly bent portion which for convenience is herein referred to, and indicated in the drawings, as a pressure foot 20 (see Fig. 1).

Referring now for the moment to Fig. 5 there is illustrated as single rod or bar 19' which is shown broken off at both ends for illustrative purposes merely. The pressure foot is indicated at 20'. While the pressure foot 20 in Fig. 1 is illustrated as having a fixed angular relation to the rod 19, it is within the contemplation of the invention to utilize a pressure foot in which the angular relation can be varied to abut the back of a work piece where it is desired that the rotary cutting tool enter the same at some other selected angular position other than at a right angle to the pressure foot or work piece. For this purpose, a pressure foot such as shown in Fig. 5 may comprise a clamp 21 fixedly mounted at a suitable position on the rod 19' by means of a nut and bolt arrangement indicated generally at 22. The clamp partly encircles the rod 19' and has two outwardly extending spaced-apart arms 23, 23, adapted to receive an extension piece 24 which is bifurcated as at 25, 25. This extension member 24 is pivotally mounted between the arms 23, 23, by a bolt 26 passing through both arms as well as the member 24 and it will be obvious that the latter can be adjusted to any fixed position by tightening the nut 27 on the bolt 26. The bifurcated portion 25, 25, permits the passage therebetween of the rotary cutting tool or drill 18, and also squares the drill to the work piece.

Referring again to Figs. 3 and 4, it will be seen that there extends substantially at right angles from the frame 12 a fulcrum post 27 for a feed lever 28 pivotally mounted thereto as at 29. This feed lever terminates in a handle grip 30 (see Fig. 2). The feed lever 28 is connected to an arm, or arms, 31 by means of a connecting feed link 32' pivotally connecting the feed lever 28 and arm 31 by suitable pivot pins 32, 32.

The arm, or arms, 31 terminate in an enlarged portion or cross piece which for convenience may be termed a feed clutch ring housing 33 which carries one or more hardened clutch rings 34 which encircle the rod or rods 19 or a single rod such as illustrated at 19'.

The arm, or arms, 31 extend transversely of the fulcrum post 27, of which there may also be two in number and the post carries a compression spring 35 encircling the same between the feed lever 28 and arm 31, the function of which will appear during the description of the operation of the mechanism.

The foregoing description of structure pertains to the pressure applying and guiding means, and the pressure feeding means cooperatively associated therewith, and refers to such structure set forth in the claims. This structure is so constructed and arranged that the drill may be moved along in a step-by-step manner in any selected angular position so that the work piece and drill are progressively advanced toward each other in counteracting compressed relation. For example, when an operator has affixed such a mechanism to a drill as illustrated in Fig. 1 in plan view, with the pressure foot 20 being brought into rear surface abutting relation with a work piece, illustrated at 17, and the drill applied against the front surface of the work piece, the handle portion 30 of the feed lever 28 will extend into the handle of the drill, the latter being indicated in dotted line position at 36. To advance the drill in a direction co-axially with respect to the cutting tool it will be observed that when the drill handle 36 is grasped together with the handle 30 of the feed lever 28, by a squeezing pressure of the operator's hand, the drill will advance against the pressure of the pressure foot 20 so that the drill and rod 19 may be regarded as being relatively movable with respect to each other. This is accomplished by virtue of the fact that as the handles 30 and 36 are squeezed together, the feed lever 28 pivots around the pin 29 in a direction toward the operator. It is assumed that one hand of the operator is holding the drill handle 37 and compressing the member 38 which closes the switch to set the drill in operation, both these later members being shown in dotted line position. If the lever 28 moves in the direction of the operator in response to the squeezing or pressure applying action of his hand, the link 32' tilts the arm 31 in the same direction so that the inner periphery of the feed clutch ring, as indicated at 39 and the diagonally opposite periphery indicated at 40, grip opposite sides of the rod 19 and the drill is advanced as shown in Figs. 1 and 4. As the cutting tool 18 drills away portions of the stock of the work piece, it is necessary further to advance the drill another step as above described. This is accomplished by releasing the manual pressure on the handles 30 and 36 whereupon the above structures are returned to the position in Fig. 3 by the release of compression stored in the spring 35. Obviously, constant repetition of the foregoing movements will progressively advance the drill in a step-by-step manner until the cutting tool has penetrated the work piece.

It will be observed that the compression action, actually by the use of one hand, not only so advances the drill but supports the weight thereof, together with the mechanism itself, in such position. The only other functions of the other hand of the operator is to keep the switch closed and prevent rotation of the drill itself, the cutting tool virtually being made to "walk through" the work piece.

The advantages of such a mechanism are numerous because the mechanism and drill interlockingly engage the work piece and the operator is therefore relieved of the necessity of applying bodily pressure to the drill as well as supporting its weight, which aids materially in avoiding drill breakage. Under such conditions, for example, it is obvious that in an eight hour day it readily can be appreciated that the economy of time and labor is considerable.

In order to insure that the drill and mechanism not only interlockingly engage the work piece in operation, but to maintain this relationship, I employ a holding or interlocking means device together with means for releasing the interlocking pressure which is substantially automatic in operation and about to be described.

Referring again to Figs. 3 and 4 in particular, it will be observed that in the frame 12, in openings provided therefore on opposite sides of the bar 19, I have inserted a spring retaining pin 41 and a fulcrum stud 42, as well as a pin 43 preferably inserted within the opposite end of the fulcrum post 27. One or more of these pins may be used in oppositely disposed positions with respect to the drill as shown in Fig. 2. With each of such a set of pins on the frame 12 I employ a loosely fitting holding clutch ring 44 which encircles the rod 19, and is also of a hardened nature to grip the same. The pin 41 passes loosely through one side of this ring and is encircled by a compression spring 45 disposed between the frame 12 and the ring 44. In a slot 46 in the fulcrum stud 42 an upper portion of the ring is loosely and freely engaged in such a manner, however, that it maintains its position with respect to the frame 12 and rod 19. This portion of the ring is disposed intermediate its ends. The end of the ring opposite the pin 41 partly encircles the pins 43.

As the pressure feeding means above described advances the feed clutch ring housing 33, and feed clutch 34, to a position such as that shown in Figs. 1 and 4, the holding clutch ring is drawn to a position shown in Fig. 4 to compress the spring 45 in which position it is rendered inoperative. The actual motion of this spring and ring is very small indeed, that is to say, just enough momentarily to release its hold on the rod while the latter is sliding through it. As the manual pressure of the feeding means is relieved and the spring 35 restores the pressure feeding means to the position shown in Fig. 3, the spring 45 tilts the holding clutch ring 44 to a position shown in Fig. 3 so that the opposite diagonal portions of the internal periphery 47 and 48 respectively grip opposite sides of the rod 19 interlockingly holding the drill in fixed position, so that the operator can cease operation to rest or otherwise, for any desired period of time.

The operation of this interlocking or holding device is in conjunction with the pressure applying means.

Assume now that the work piece has been properly drilled and it is desired to remove the drill and mechanism out of engagement with the work piece, either temporarily or permanently, it is but necessary manually to compress the spring 45 to relieve the holding clutch from its tilted gripping position in order to assume a loosely mounted relation with the rod 19.

One suitable means for releasing the interlocking pressure of the holding means which I employ is to provide a release lever shown in the form of a C-shaped member or yoke 49 which is loosely mounted on the pins 43 and extends in a curved line to within easy reach of the hand of the operator, especially the hand for applying manual pressure on the handles 30 and 36. This member 49 is disposed between the holding clutch ring 44 and the frame 12 in such a manner to tilt the same as shown in Fig. 4 to compress the spring 45 by slight pressure of an operator's thumb. The holding clutch ring will assume its loosely mounted position 44 as shown in Fig. 4 of the drawing.

It will thus be seen that the objects hereinbefore set forth may readily and efficiently be attained, and since certain changes may be made in the above construction and different embodiments of the invention could be made without departing from the scope thereof, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A device adapted for feeding a motor driven drill into a work piece; said device comprising an elongated rod having an angularly disposed foot at one end thereof for engaging said work piece on the side thereof opposite said drill; first and second single clutch rings only, adapted to cooperate with said rod; means for attaching said device to said motor with said rod substantially parallel to the axis of said drill, including a separate front guide bearing and a rear guide bearing frame, respectively attachable, individually and in spaced relation, to the front and rear of said motor, in which said rod is axially slidable to move said foot towards and away from said drill; resilient means, including a fulcrum element and spring member mounted on said bearing frame on opposite sides of said rod, cooperatively connected with the first of said single rings and normally automatically holding it in a position to prevent relative movement of said foot and drill away from each other while allowing relative movement thereof towards each other; a second fulcrum element mounted on the other side of said frame; and a manually-actuated lever pivotally mounted on the end of said second fulcrum element, and cooperating with the second of said single rings by means of a link pivotally connecting said lever and second single ring for moving it into clutching relation with said rod to move said foot and drill towards each other.

2. The structure set forth in claim 1 together with a second resilient means cooperating with said lever and the second of said rings for automatically moving said second ring out of clutching engagement with said rod and restoring it and said lever to their normal positions when said lever is released following a clutch-actuating movement thereof.

3. The structure set forth in claim 1 in which said device is provided with a second, manually-actuated lever cooperating with said first clutch ring for de-clutching the same to facilitate the separation of said device from said work piece.

4. A device adapted for feeding a motor driven drill into a work piece; said device comprising two, spaced, parallel disposed rods connected at one end by a foot angularly disposed to the plane of said rods for engaging said work piece on the side thereof opposite said drill; a first pair of single clutch rings adapted to cooperate with said rods; a second pair of single clutch rings adapted to cooperate with said rods; means for attaching said device to said motor with said rods substantially parallel to the axis of said drill, including a pair of separate front guide bearings and a pair of separate rear guide bearings in a guide bearing frame, respectively attachable, individually and in spaced relation, to the front and rear of said motor, in which said rods are axially slidable to allow relative movements of said foot and drill towards and away from each other; resilient means, including a pair of fulcrum elements and a pair of spring members mounted on said bearing frame on opposite sides of said rods, cooperatively connected with said first pair of single clutch rings and normally automatically holding them in rod-clutching positions preventing relative movements of said foot and drill away from each other but allowing relative movements thereof towards each other; a pair of second fulcrum elements mounted on the other side of said frame; and a manually-actuated lever pivotally mounted on the ends of said pair of second fulcrum elements cooperating with said second pair of single clutch rings by means of a pair of links pivotally connecting said lever and second pair of rings for moving them into clutching relation with said rods to move said foot and said drill towards each other.

5. The structure set forth in claim 4 together with a second pair of resilient means cooperating with said lever and said second pair of rings for automatically moving said second pair of rings out of clutching engagement with said rods and restoring said rings and said lever to their normal positions when said lever is released following a clutch-actuating movement thereof.

6. The structure set forth in claim 4 in which said device is provided with a second manually-actuated lever cooperating with said first pair of clutch rings for de-clutching the same to facilitate the separation of said device from said work piece.

References Cited in the file of this patent

UNITED STATES PATENTS

| | | |
|---|---|---|
| 975,031 | Greene | Nov. 8, 1910 |
| 1,590,643 | Neuwelt | June 29, 1926 |
| 2,227,397 | Lucker | Dec. 31, 1940 |
| 2,466,965 | Pitts | Apr. 12, 1949 |
| 2,629,267 | Hart | Feb. 24, 1953 |